United States Patent [19]
Littlefield

[11] Patent Number: 5,959,443
[45] Date of Patent: Sep. 28, 1999

[54] CONTROLLER CIRCUIT FOR CONTROLLING A STEP DOWN SWITCHING REGULATOR OPERATING IN DISCONTINUOUS CONDUCTION MODE

[75] Inventor: Troy J. Littlefield, Colorado Springs, Colo.

[73] Assignee: Toko, Inc., Japan

[21] Appl. No.: 08/970,664

[22] Filed: Nov. 14, 1997

[51] Int. Cl.[6] .................................................... G05F 1/565

[52] U.S. Cl. ......................... 323/287; 323/283; 323/284

[58] Field of Search ...................................... 323/282, 283, 323/286, 287, 284, 285

[56] References Cited

U.S. PATENT DOCUMENTS

| | | | |
|---|---|---|---|
| 3,875,458 | 4/1975 | Kappenhagen | 315/194 |
| 4,357,572 | 11/1982 | Andersen et al. | 323/286 |
| 5,568,044 | 10/1996 | Bittner | 323/287 |
| 5,629,610 | 5/1997 | Pedrazzini et al. | 323/283 |
| 5,757,214 | 5/1998 | Stoddard et al. | 323/282 |
| 5,770,940 | 6/1998 | Goder | 323/282 |

*Primary Examiner*—Peter S. Wong
*Assistant Examiner*—Derek J. Jardieu
*Attorney, Agent, or Firm*—William E. Hein

[57] ABSTRACT

A controller circuit for controlling and continuously varying the average value of discontinuous current pulses in a step down switching regulator operating in discontinuous conduction mode effects improvements in efficiency and output ripple of the switching regulator.

37 Claims, 5 Drawing Sheets

FIGURE 1A (PRIOR ART)

HEAVY LOAD

MODERATE LOAD

LIGHT LOAD

CONTROLLER CIRCUIT FOR CONTROLLING A STEP DOWN SWITCHING REGULATOR OPERATING IN DISCONTINUOUS CONDUCTION MODE

BACKGROUND AND SUMMARY OF THE INVENTION

This invention relates generally to regulated step down or buck power converters and, more particularly, to a step down controller employed in such power converters. Various ways of performing both step down power conversion and regulated power conversion are known in the prior art. Switched mode operation is a common power conversion technique. The devices which use the regulation information to control switching of the power switching devices in power converters are known as power controllers.

The primary purpose of a step down converter is to efficiently transfer energy from a relatively high input voltage source to a lower voltage output source. In the case of a regulated step down converter, the output voltage should remain substantially constant and insensitive to input voltage and loading variations. In general, two common techniques for implementing step down converters have been employed in prior art linear converters and switching converters.

Linear step down converters provide a constant current between the input source and the output source. The voltage difference between input and output is dissipated across a pass element (e.g. a transistor). One major disadvantage of linear step down regulators is that the power loss in the pass element tends to cause relatively inefficient energy transfer between the input voltage source and the output. One major advantage of linear step down regulators is low ripple voltage at the output source.

Switching step down converters typically consist of a reactive pass element (e.g. an inductor) and one or more switching devices. The purpose of the step down controller is to selectively turn the switching devices on and off in a manner such that the average current flow between the input and output source meets the average current requirements of the load while maintaining a constant output voltage. Since the reactive components and switching devices dissipate very little power, switching converters tend to transfer energy from the input to the output in a very efficient manner. One major disadvantage of switching regulators is relatively high output ripple voltage compared to linear regulators.

In general, a step down converter utilizing an inductive pass element can be operated in two different modes. In a converter operating in continuous conduction mode (CCM), the current flowing in the inductive pass element is continuously changing and the average DC current is relatively large compared to peak to peak variation in the current. In such CCM converters, the instantaneous current through the inductive component generally remains greater than zero. The advantage of a converter of this type is that high average currents can be achieved while maintaining relatively smaller peak-to-peak currents. This will typically result in lower output ripple voltage. The major disadvantage of CCM converters is that they tend to be relatively complex and difficult to stabilize.

In a converter operating in discontinuous conduction mode (DCM), the current flowing in the inductive pass element will typically start at zero current, ramp upward to some peak value, and periodically return to zero. Current is therefore transferred between the input and output sources in discrete current packets whose average current can be relatively predictable. The discontinuous nature of the energy transfer between input and output tends to greatly simplify the step down converter control scheme. The disadvantage of converters of this type is that output ripple voltage tends to be relatively high compared to step down converters operating in the CCM mode.

Figure 1A:
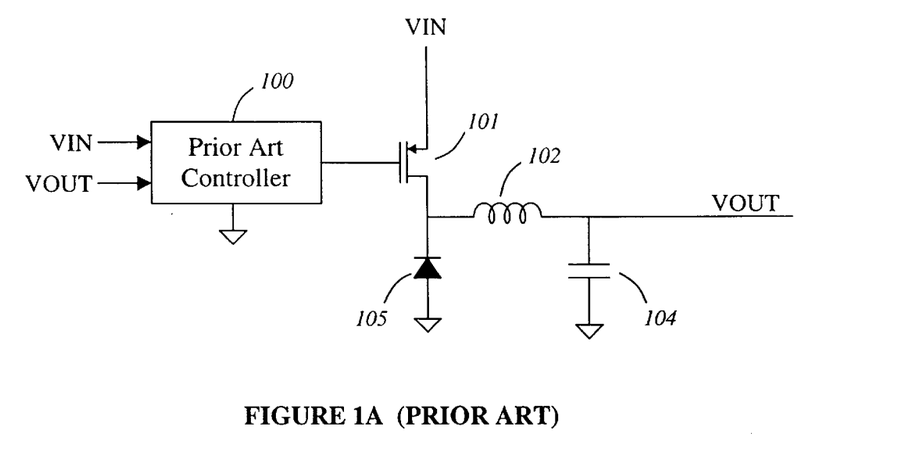
FIG. 1A is a schematic block diagram of a typical prior art step down regulator operating in discontinuous conduction mode.
Figure 1B:
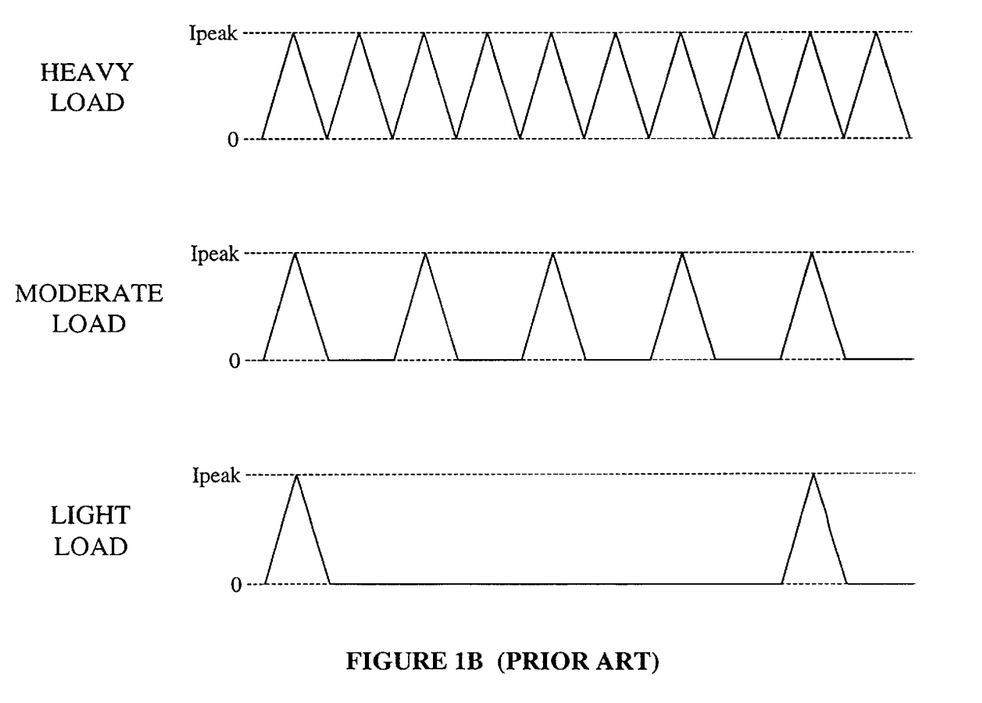
FIG. 1B illustrates typical waveforms of current flowing through inductor 102 of FIG. 1A under heavy, moderate, and light loading conditions.

FIG. 1B illustrates typical instantaneous inductor current waveforms that might be observed in the prior art controller of FIG. 1A that utilizes a DCM step down technique. Under maximum load, the current through the inductive pass element continuously ramps between zero current and a fixed peak current. Under moderate and light loads, the current ramps from zero current to the same fixed peak current, ramps back down to zero current, and then maintains the inductor current at zero for a period of time. Under moderate and light load conditions, the average inductor current is reduced but the peak inductor current remains constant.

Figure 2A:
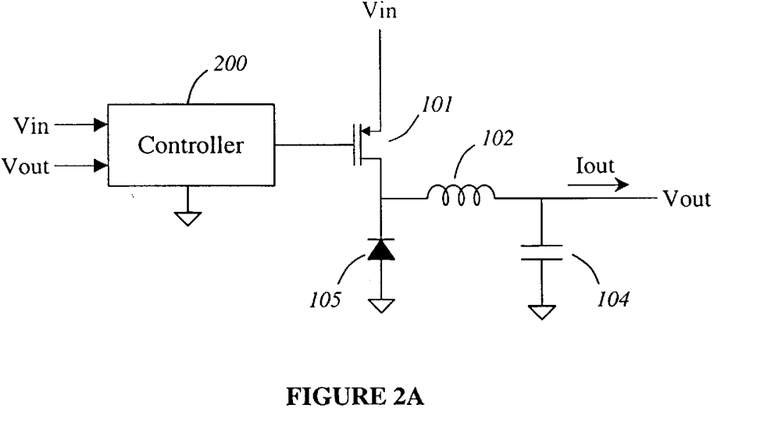
FIG. 2A is a schematic block diagram of a step down regulator operating in discontinuous conduction mode and controlled by the step down controller of the present invention.
Figure 2B:
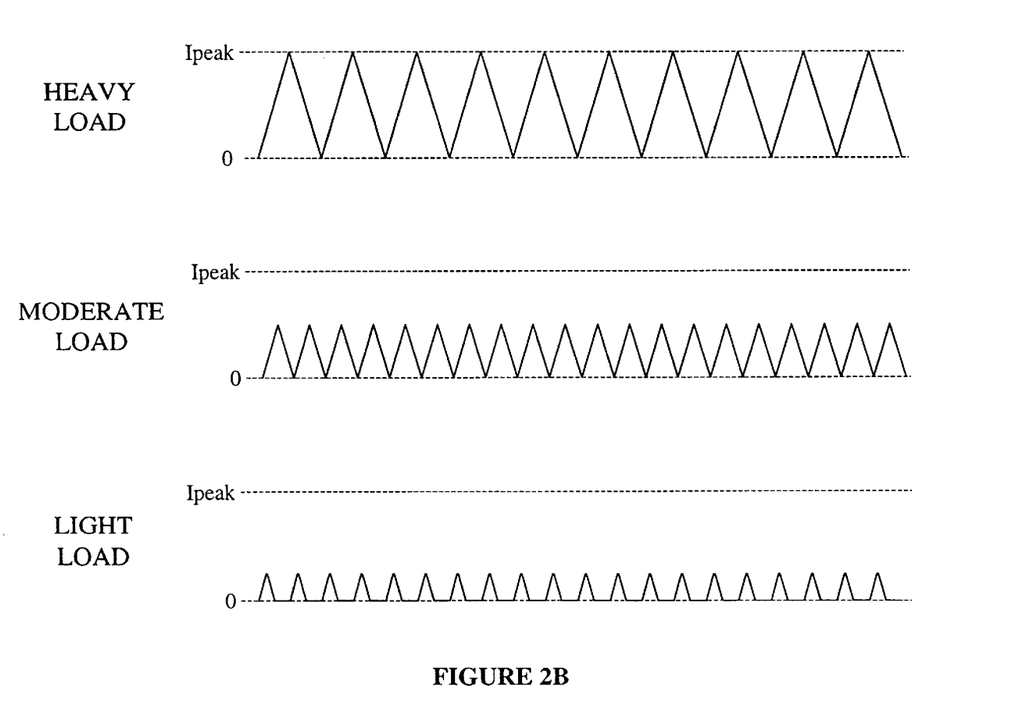
FIG. 2B illustrates typical waveforms of current flowing through inductor 102 of FIG. 2A under heavy, moderate, and light loading conditions.

FIG. 2B illustrates the inductor current waveforms in the present DCM buck converter of FIG. 2A. Under maximum load current, the observed operation of the present invention is similar to that of prior art. However, under moderate and light load conditions, operation is significantly different. Under moderate load conditions the inductor current maintains continuous ramping of the current between zero and some peak value. However, unlike the prior art controller, the value of the peak inductor current is continuously decreased under loading conditions less than the maximum. The advantages of such a control scheme include lower output ripple voltage and improved converter efficiency.

DETAILED DESCRIPTION OF THE INVENTION

Figure 3:
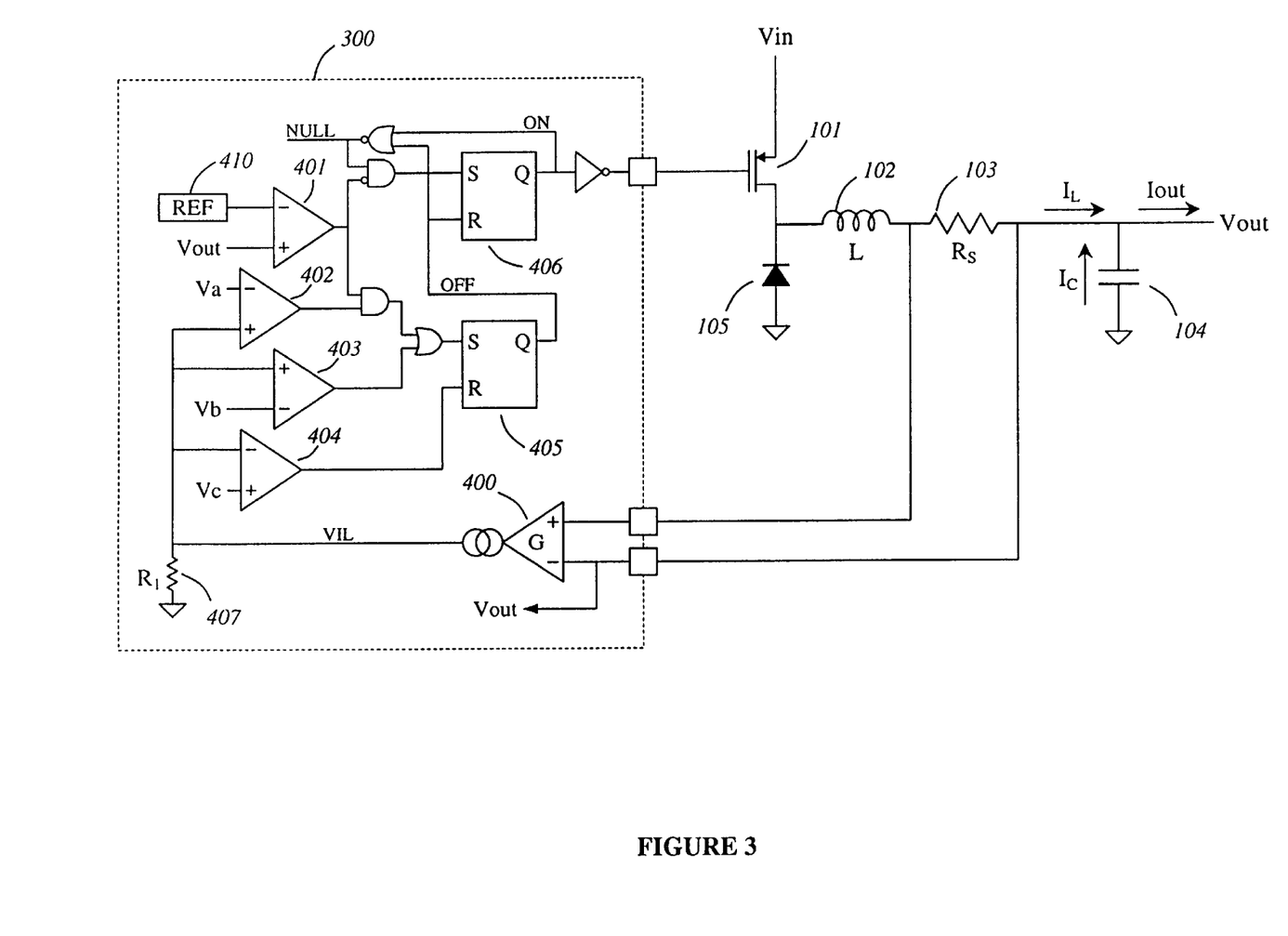
FIG. 3 is a detailed schematic diagram of a step down regulator and step down controller therefor, both in accordance with a first embodiment of the present invention.

Referring now to FIG. 3, there is shown a typical application circuit employing a step down controller 300 in accordance with the present invention. Step down controller 300 should periodically turn on a switch 101 in such a manner as to maintain the output voltage Vout substantially constant independent of variations in input voltage Vin and current load Iout. Step down controller 300 must be capable of generating a drive signal for switch 101, given as inputs the instantaneous voltage present at Vout, and the instantaneous current in the inductive pass element 102. A resistive element 103, acting as a current sensing device, generates a differential voltage proportional to the instantaneous inductor current. The desired current through inductor 102 should ramp between a minimum current value of zero and a maximum current of approximately 2*Iout. The resulting average current through inductor 102 will be equal to the current load Iout.

Step down controller 300 has three operational states. They are the ON state, the OFF state, and the NULL state, corresponding to assertion of the signals ON, OFF, and NULL, respectively. During the ON state, transistor switch 101 will be on and the current flowing in inductor 102 will be increasing at a rate proportional to (Vin−Vout). During the OFF state, transistor 101 will be off. Current flowing in inductor 102 will be non-zero and decreasing at a rate proportional to (−Vout). During the NULL state, transistor 101 will be off, and the current flowing in inductor 102 will be approximately zero.

Assuming that the step down controller 300 is in the NULL state and that Vout is initially greater than an internal reference 410, as soon as output voltage Vout drops to a value less than the internal reference 410, the output of comparator 401 will toggle from an asserted to a non-asserted state. With the NULL signal asserted, and the output of comparator 401 not asserted, a flip-flop 406 will be set, thereby asserting the ON signal. Assertion of the ON signal forces the de-assertion of the NULL signal, indicating a change of state from the NULL state to the ON state. During the ON state, transistor 101 will be turned on, and current flowing in inductor 102 will be increasing. Transistor 101 will remain on until conditions sensed by switching controller 300 indicate that the ON state should be terminated.

As previously mentioned, the ON signal is immediately asserted following the point in time at which Vout drops below reference 410. At the initiation of the ON signal, current flowing through inductor 102 is zero. Assuming that the output current Iout is greater than zero, the output voltage Vout will droop. Throughout the duration of the ON state, inductor current $I_L$ will be continuously increasing. At some point, the current $I_L$ will become greater than the output current Iout. At this point, the output voltage Vout will begin increasing. As the inductor current $I_L$ continues to increase, Vout will also continue to increase. Since the voltage change across a capacitor over a given time interval is equal to the time integral of the capacitor current divided by the capacitor value, it will be understood that when Vout rises and is equal to the voltage generated by reference 410, the average current flowing through capacitor 104 over the duration of the ON state must be equal to zero. It will also be understood that since the average current flowing in the capacitor 104 is zero, the average current flowing in the inductor 102 must be equal to the average output current Iout. It is at this point that the ON state should be terminated. When the output voltage Vout rises to a value greater than the voltage generated by reference 410, the output of comparator 401 will be asserted. Asserting the output of comparator 401 will set flip-flop 405, thereby asserting the OFF signal and terminating the ON state.

Comparator 402 of step down controller 300 is intended to control the minimum value of the current pulse passed through inductor 102. After the ON state has been initiated, it will not be terminated until the inductor current exceeds the minimum threshold set by comparator 402 and reference Va. By limited the minimum size of the current pulses, efficiency will be improved under light loading conditions.

Comparator 403 of step down controller 300 is intended to control the maximum value of the current pulse passed through inductor 102. If the current flowing through inductor 102 becomes large enough to toggle the state of comparator 403, the ON state will be terminated, and the OFF state will be initiated, independent of the level of the output voltage Vout.

After the OFF state has been initiated, and the ON state has been terminated, switch 101 will be turned off. Current flowing in inductor 102 will begin decreasing. Comparator 404 is included to guarantee that the switching converter will operate in discontinuous conduction mode (DCM). As long as the current flowing through inductor 102 is greater than a threshold very close to zero, the OFF state will be maintained, and current flowing in the inductor 102 will continue to decrease. After the inductor current has dropped to a value very close to zero, comparator 404 will toggle, thereby resetting flip-flop 405 and terminating the OFF state. With both the ON and OFF signals de-asserted, the NULL signal will be asserted, and the entire process described above will be repeated.

Figure 4:
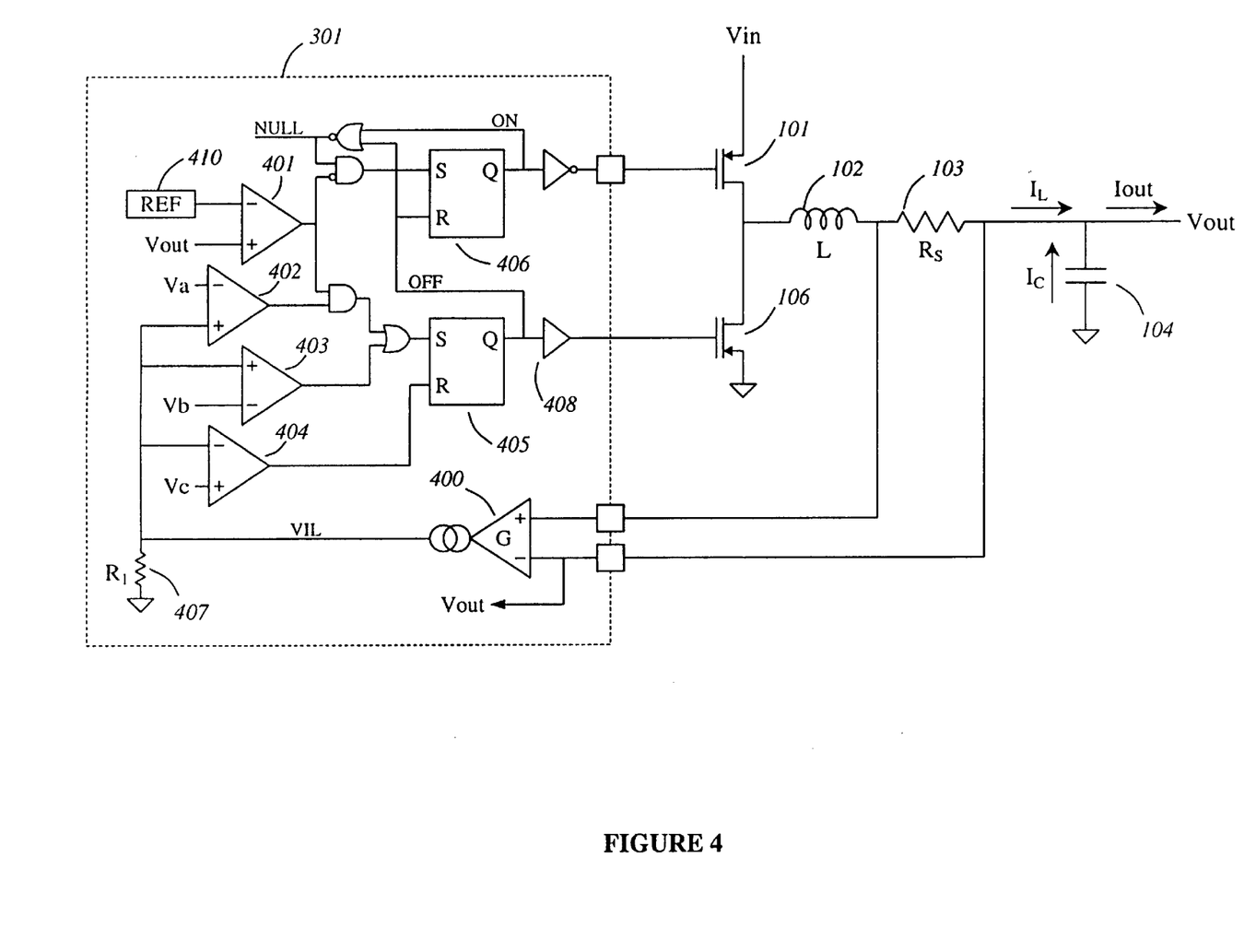
FIG. 4 is a detailed schematic diagram of a step down regulator and step down controller therefor, both in accordance with a second embodiment of the present invention.

Referring now to FIG. 4, there is shown a second embodiment of the present invention employing synchronous rectification. As previously mentioned, the step down controller of the present invention employs the three operational states ON, OFF, and NULL. During the OFF state of operation, transistor 101 is off, and current flowing through inductor 102 is greater than zero. In the first embodiment described above, inductor current $I_L$ flowed through inductor 102 and rectifier 105. The second embodiment takes advantage of the OFF signal to drive synchronous switch 106. Aside from the addition of driver buffer 408 to step down controller 301, no significant modifications are made to controller 300 of FIG. 3. Driver buffer 408 must exhibit sufficient turn-on and turn-off delays to insure that simultaneous conduction of transistors 101 and 106 is avoided.

Figure 5:
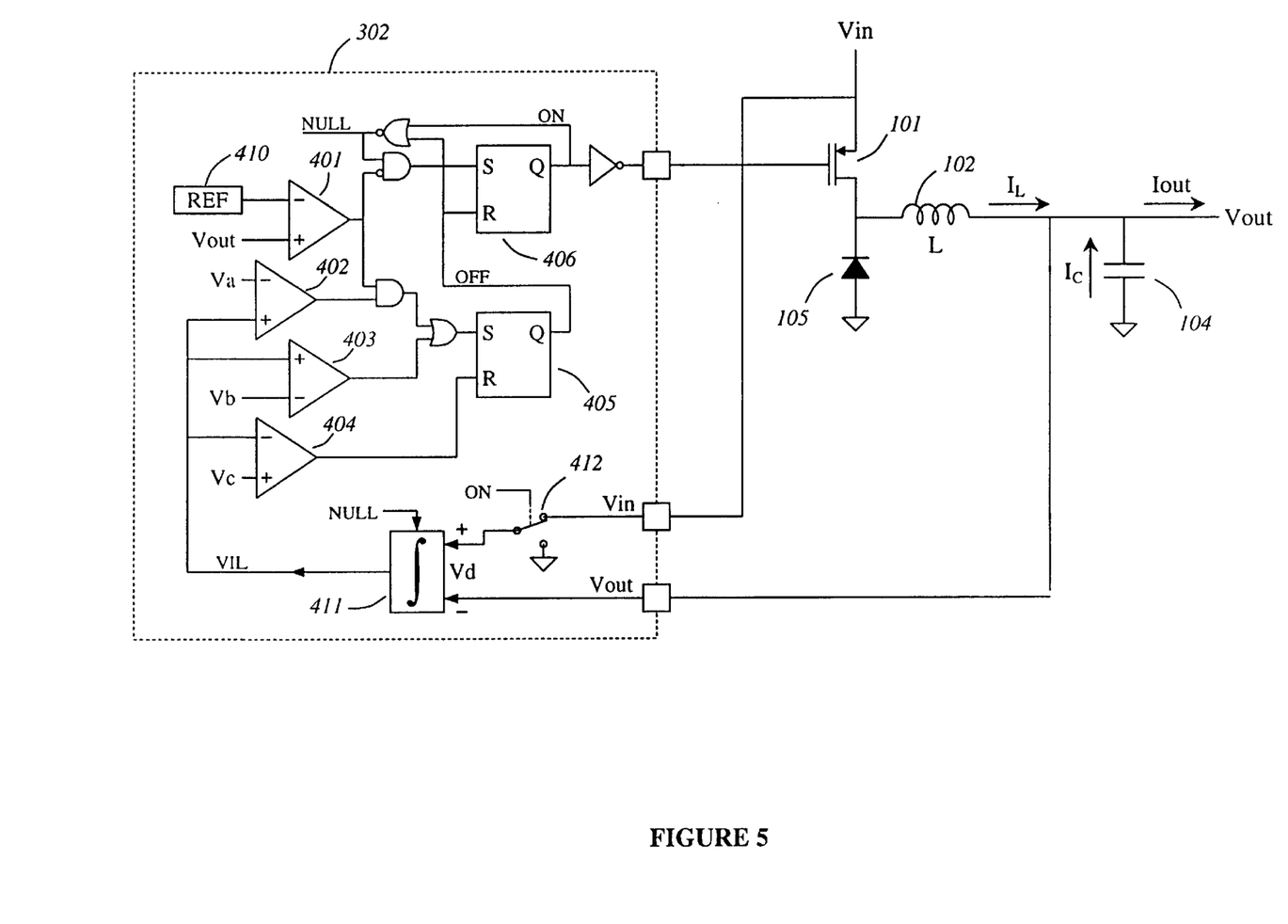
FIG. 5 is a detailed schematic diagram of a step down regulator and step down controller therefor, both in accordance with a third embodiment of the present invention.

Referring now to FIG. 5, there is shown a third embodiment of the present invention, in which the external current-sensing resistor 103 of FIG. 1A has been eliminated. As previously mentioned, during the ON state, current flowing through inductor 102 will be increasing at a rate proportional to the difference between the input and output voltages (Vin−Vout). During the OFF state, current flowing through inductor 102 will be decreasing at a rate proportional to (−Vout). During the NULL state, current flowing through inductor 102 will be approximately zero.

In addition to eliminating external current-sensing resistor 103 of FIG. 1A, transconductance amplifier 400 and gain resistor 407, internal to switching amplifier 300 of FIG. 1A, have also been eliminated in the embodiment of FIG. 5. An integrating amplifier 411 is provided in switching controller 302 to integrate differential analog input Vd to produce analog output VIL. Depending upon the state of switch 412, integrating amplifier 411 will either integrate the difference between Vin and Vout when the ON signal is asserted, or will integrate the difference between ground and Vout when the ON signal is not asserted. The digital input NULL to integrating amplifier 411 initializes integrating amplifier to a zero-output state. The integration function of integrating amplifier 411 can be readily implemented using relatively simple linear or switched techniques. Many possible implementations of integrating amplifier 411 are well within the capabilities of those skilled in the art.

Integrating amplifier 411, together with switch 412, effectively provides an approximate method for mirroring the instantaneous current flowing through inductor 102 without the specific need for an external current-sensing resistor. When in the NULL state, the NULL signal will be asserted, and current flowing through inductor 102 is zero. With the NULL signal asserted, the output of integrating amplifier 411 will also be initialized to zero. When switching to the ON state, the ON signal will be asserted, and the NULL signal will be de-asserted. Current flowing in inductor 102 will increase at a rate proportional to the difference between input voltage Vin and output voltage Vout. Also during the ON state, the output VIL of integrating amplifier 411 will be increasing at a rate proportional to the difference between Vin and Vout. When switching from the ON state to the OFF state, the ON signal will be de-asserted, and the OFF signal will be asserted. Current flowing through inductor 102 will be decreasing at a rate proportional to −Vout. Also during the OFF state, switch 412 will toggle to ground, and the output of integrating amplifier 411 will ramp downward at a rate proportional to −Vout. When returning to the NULL state, integrating amplifier 411 will be zeroed as the current flowing through inductor 302 also returns to zero.

Several embodiments have been described above for implementing a controller for a switch mode step down controller operating in discontinuous conduction mode. The novel approach of this controller demonstrates significant improvements in efficiency and output ripple voltage when compared to prior art DCM converters. Although the present invention has been described with reference to specific embodiments, the descriptions are for the purpose of illustration and are not to be construed as limiting. Those skilled in the art will appreciate that the control scheme of the present invention can be implemented with various modifications to the described embodiments.

I claim:

1. A controller circuit for controlling a step down switching regulator of the type having an input voltage source connected to a first switching device to be controlled by said controller circuit, an output terminal for providing a substantially constant output voltage that is less than an input voltage provided by the input voltage source, a capacitor connected to the output terminal, an inductive energy storage element connected between the first switching device and the output terminal, a current sensing resistor connected in series with the inductive energy storage element, and a rectifying device connected between ground and the first switching device, the controller circuit comprising:

first circuit means for monitoring the output voltage of the switching regulator to generate a first feedback signal;

second circuit means for monitoring a current flowing in the inductive energy storage element to generate a second feedback signal;

third circuit means for initiating a first state of operation in response to the first feedback signal, the current flowing in the inductive energy storage element continuously increasing during the first state of operation;

fourth circuit means for initiating a second state of operation in response to the first feedback signal, the current flowing in the inductive energy storage element continuously decreasing during the second state of operation; and fifth circuit means for initiating a third state of operation in response to the second feedback signal, the current flowing in the inductive energy storage element being substantially equal to zero during the third state of operation.

2. A controller circuit as in claim 1 wherein said rectifying device comprises a second switching device and said fourth circuit means is operative for turning on said second switching device during said second state of operation.

3. A controller circuit as in claim 1 wherein a minimum duration of said first state of operation is a function of the second feedback signal exceeding a first reference signal.

4. A controller circuit as in claim 3 wherein said rectifying device comprises a second switching device and said fourth circuit means is operative for turning on said second switching device during said second state of operation.

5. A controller circuit as in claim 1 wherein a maximum duration of said first state of operation is a function of the second feedback signal exceeding a second reference signal.

6. A controller circuit as in claim 5 wherein said rectifying device comprises a second switching device and said fourth circuit means is operative for turning on said second switching device during said second state of operation.

7. A controller circuit as in claim 1 wherein a minimum duration of said first state of operation is a function of the second feedback signal exceeding a first reference signal and a maximum duration of said first state of operation is a function of the second feedback signal exceeding a second reference signal.

8. A controller circuit as in claim 7 wherein said rectifying device comprises a second switching device and said fourth circuit means is operative for turning on said second switching device during said second state of operation.

9. A controller circuit as in claim 7 wherein the minimum and maximum duration of the first state of operation effectively limits a minimum and a maximum peak current flowing through the inductive energy storage element.

10. A controller circuit as in claim 9 wherein said rectifying device comprises a second switching device and said fourth circuit means is operative for turning on said second switching device during said second state of operation.

11. A controller circuit as in claim 9 wherein the response to the first feedback signal serves to continuously vary a nominal peak current flowing through the inductive energy storage element between said minimum peak current and said maximum peak current.

12. A controller circuit as in claim 11 wherein said rectifying device comprises a second switching device and said fourth circuit means is operative for turning on said second switching device during said second state of operation.

13. A controller circuit for controlling a step down switching regulator of the type having an input voltage source connected to a first switching device to be controlled by said controller circuit, an output terminal for providing a substantially constant output voltage that is less than an input voltage provided by the input voltage source, a capacitor connected to the output terminal, an inductive energy storage element connected between the first switching device and the output terminal, and a rectifying device connected between ground and the first switching device, the controller circuit comprising:

first circuit means for monitoring the output voltage of the switching regulator to generate a first feedback signal;

second circuit means for integrating a differential voltage across the inductive energy storage element to generate a second feedback signal;

third circuit means for initiating a first state of operation in response to the first feedback signal, the current flowing in the inductive energy storage element continuously increasing during the first state of operation;

fourth circuit means for initiating a second state of operation in response to the first feedback signal, the current flowing in the inductive energy storage element continuously decreasing during the second state of operation; and fifth circuit means for initiating a third state of operation in response to the second feedback signal, the current flowing in the inductive energy storage element being substantially equal to zero during the third state of operation.

14. A controller circuit as in claim 13 wherein said second circuit means comprises a clocked integrator.

15. A controller circuit as in claim 13 wherein said rectifying device comprises a second switching device and said fourth circuit means is operative for turning on said second switching device during said second state of operation.

16. A controller circuit as in claim 13 wherein a minimum duration of said first state of operation is a function of the second feedback signal exceeding a first reference signal.

17. A controller circuit as in claim 16 wherein said rectifying device comprises a second switching device and said fourth circuit means is operative for turning on said second switching device during said second state of operation.

18. A controller circuit as in claim 13 wherein a maximum duration of said first state of operation is a function of the second feedback signal exceeding a second reference signal.

19. A controller circuit as in claim 18 wherein said rectifying device comprises a second switching device and said fourth circuit means is operative for turning on said second switching device during said second state of operation.

20. A controller circuit as in claim 13 wherein a minimum duration of said first state of operation is a function of the second feedback signal exceeding a first reference signal and a maximum duration of said first state of operation is a function of the second feedback signal exceeding a second reference signal.

21. A controller circuit as in claim 20 wherein said rectifying device comprises a second switching device and said fourth circuit means is operative for turning on said second switching device during said second state of operation.

22. A controller circuit as in claim 20 wherein the minimum and maximum duration of the first state of operation effectively limits a minimum and a maximum peak current flowing through the inductive energy storage element.

23. A controller circuit as in claim 22 wherein said rectifying device comprises a second switching device and said fourth circuit means is operative for turning on said second switching device during said second state of operation.

24. A controller circuit as in claim 22 wherein the response to the first feedback signal serves to continuously vary a nominal peak current flowing through the inductive energy storage element between said minimum peak current and said maximum peak current.

25. A controller circuit as in claim 24 wherein said rectifying device comprises a second switching device and said fourth circuit means is operative for turning on said second switching device during said second state of operation.

26. A controller circuit for controlling a step down switching regulator of the type having an input voltage source connected to a first switching device to be controlled by said controller circuit, an output terminal for providing a substantially constant output voltage that is less than an input voltage provided by the input voltage source, a capacitor connected to the output terminal, an inductive energy storage element connected between the first switching device and the output terminal, and a rectifying device connected between ground and the first switching device, the controller circuit comprising:

first circuit means for monitoring the output voltage of the switching regulator to generate a first feedback signal;

second circuit means for sensing a current flowing in the inductive energy storage element to generate a second feedback signal;

third circuit means for initiating a first state of operation in response to the first feedback signal, the current flowing in the inductive energy storage element continuously increasing during the first state of operation;

fourth circuit means for initiating a second state of operation in response to the first feedback signal, the current flowing in the inductive energy storage element continuously decreasing during the second state of operation; and fifth circuit means for initiating a third state of operation in response to the second feedback signal, the current flowing in the inductive energy storage element being substantially equal to zero during the third state of operation.

27. A controller circuit as in claim 26 wherein said rectifying device comprises a second switching device and said fourth circuit means is operative for turning on said second switching device during said second state of operation.

28. A controller circuit as in claim 26 wherein a minimum duration of said first state of operation is a function of the second feedback signal exceeding a first reference signal.

29. A controller circuit as in claim 28 wherein said rectifying device comprises a second switching device and said fourth circuit means is operative for turning on said second switching device during said second state of operation.

30. A controller circuit as in claim 26 wherein a maximum duration of said first state of operation is a function of the second feedback signal exceeding a second reference signal.

31. A controller circuit as in claim 30 wherein said rectifying device comprises a second switching device and said fourth circuit means is operative for turning on said second switching device during said second state of operation.

32. A controller circuit as in claim 26 wherein a minimum duration of said first state of operation is a function of the second feedback signal exceeding a first reference signal and a maximum duration of said first state of operation is a function of the second feedback signal exceeding a second reference signal.

33. A controller circuit as in claim 32 wherein said rectifying device comprises a second switching device and said fourth circuit means is operative for turning on said second switching device during said second state of operation.

34. A controller circuit as in claim 32 wherein the minimum and maximum duration of the first state of operation effectively limits a minimum and a maximum peak current flowing through the inductive energy storage element.

35. A controller circuit as in claim 34 wherein said rectifying device comprises a second switching device and said fourth circuit means is operative for turning on said second switching device during said second state of operation.

36. A controller circuit as in claim 34 wherein the response to the first feedback signal serves to continuously vary a nominal peak current flowing through the inductive energy storage element between said minimum peak current and said maximum peak current.

37. A controller circuit as in claim 36 wherein said rectifying device comprises a second switching device and said fourth circuit means is operative for turning on said second switching device during said second state of operation.

* * * * *